(12) United States Patent
Chen et al.

(10) Patent No.: US 10,247,437 B2
(45) Date of Patent: Apr. 2, 2019

(54) AREA ABNORMALITY DETECTING SYSTEM AND AREA ABNORMALITY DETECTING METHOD

(71) Applicant: DELTA ELECTRONICS, INC., Taoyuan (TW)

(72) Inventors: Meng-Seng Chen, Taoyuan (TW); Tien-Szu Lo, Taoyuan (TW); Hsiang-Pin Lee, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 155 days.

(21) Appl. No.: 15/336,971

(22) Filed: Oct. 28, 2016

(65) Prior Publication Data

US 2017/0205106 A1    Jul. 20, 2017

(30) Foreign Application Priority Data

Jan. 19, 2016 (TW) .............................. 105101492 A

(51) Int. Cl.
    *G05B 21/00*      (2006.01)
    *G01M 1/38*      (2006.01)
    (Continued)

(52) U.S. Cl.
    CPC .............. *F24F 11/30* (2018.01); *G05B 15/02* (2013.01); *F24F 11/32* (2018.01);
    (Continued)

(58) Field of Classification Search
    CPC ........ F24F 11/30; F24F 11/32; F24F 2110/10; F24F 2110/20; F24F 2110/50; F24F 2110/70; F24F 2120/10; G05B 15/02
    (Continued)

(56) References Cited

U.S. PATENT DOCUMENTS

| | | | |
|---|---|---|---|
| 2010/0070055 A1 | 3/2010 | Kennedy et al. | |
| 2012/0303164 A1* | 11/2012 | Smith ................ | H05K 7/20745 700/276 |

(Continued)

FOREIGN PATENT DOCUMENTS

| | | |
|---|---|---|
| CN | 104063981 | 9/2014 |
| EP | 2169484 | 3/2010 |

(Continued)

OTHER PUBLICATIONS

European Search Report dated Jun. 1, 2017 from corresponding application No. EP16196781.5.

(Continued)

*Primary Examiner* — Mohammad Ali
*Assistant Examiner* — Md Azad
(74) *Attorney, Agent, or Firm* — Hauptman Ham, LLP

(57) ABSTRACT

An area abnormality detecting system includes multiple apparatuses, multiple sensors and a detecting server. The system is adopted in a space, which is segmented into several blocks with same size. Multiple areas of the space are defined by the blocks separately. The apparatuses are respectively corresponding to each area for providing environmental improving services. The sensors are respectively corresponding to each area for sensing indoor environment of each area. After an abnormality occurs, the detecting server determines an abnormal area and an occurring time corresponding to the abnormality, and obtains apparatus parameters of apparatuses corresponding to the abnormal area that are recorded at the occurring time, so as to determine the occurring reason for the abnormality based on the apparatus parameters.

18 Claims, 13 Drawing Sheets

(51) Int. Cl.
  *G05B 13/00*   (2006.01)
  *G05B 15/00*   (2006.01)
  *G05D 23/00*   (2006.01)
  *F24F 11/30*   (2018.01)
  *G05B 15/02*   (2006.01)
  *F24F 110/10*  (2018.01)
  *F24F 110/20*  (2018.01)
  *F24F 110/50*  (2018.01)
  *F24F 110/70*  (2018.01)
  *F24F 120/10*  (2018.01)
  *F24F 11/32*   (2018.01)

(52) U.S. Cl.
  CPC ....... *F24F 2110/10* (2018.01); *F24F 2110/20* (2018.01); *F24F 2110/50* (2018.01); *F24F 2110/70* (2018.01); *F24F 2120/10* (2018.01)

(58) Field of Classification Search
  USPC .......................................................... 700/276
  See application file for complete search history.

(56) References Cited

U.S. PATENT DOCUMENTS

| | | | |
|---|---|---|---|
| 2013/0097128 A1* | 4/2013 | Suzuki | G05B 23/0264 707/693 |
| 2013/0132000 A1* | 5/2013 | Tamaki | G05B 23/0224 702/35 |
| 2015/0370272 A1* | 12/2015 | Reddy | G05B 15/02 700/278 |
| 2016/0327921 A1* | 11/2016 | Ribbich | F24F 11/30 |
| 2017/0045252 A1* | 2/2017 | Federspiel | G06Q 10/06 |

FOREIGN PATENT DOCUMENTS

TW   200734975   9/2007
TW   M510514    10/2015

OTHER PUBLICATIONS

Office Action dated Nov. 1, 2016 from corresponding application No. TW 105101492.

* cited by examiner

AREA ABNORMALITY DETECTING SYSTEM AND AREA ABNORMALITY DETECTING METHOD

BACKGROUND OF THE INVENTION

1. Field of the Invention

The invention relates to a detecting system and a detecting method, and in particularly to an area abnormality detecting system and an area abnormality detecting method.

2. Description of Prior Art

In order to adjust comfort degree of indoor space temperature, the modern buildings now are usually arranged with central air-conditioning systems, and use indoor apparatuses, such as pre-cooling air handling units (PAHs), fan coil units (FCUs), etc., to blow cold air into the buildings. Also, the buildings use a lot of sensors to detect various environmental statuses inside the buildings.

General speaking, these indoor apparatuses and sensors are usually corresponding to different areas inside the building, such as lobby, meeting rooms, working areas, spare rooms, etc. The sensors are used to detect various environmental statuses, such as temperature, humidity and person existence in each area, and each of the indoor apparatuses is used to improve environmental comfort conditions, such as reducing indoor temperature, increasing indoor humidity, etc., in each area.

Moreover, if the aforementioned central air-conditioning system is an intelligent air-conditioning system, then a manager of the system can preset actual position of each area inside the building (such as coordinates), and the relationship among the indoor apparatuses, the sensors and each of the areas in an intelligence controlling algorithm adopted by the system. Therefore, a processor therein can automatically control each of the indoor apparatuses to execute the improving services according to sensing data received from each of the sensors (for example, when a person is detected to enter a predetermined area, the processor automatically turns on an indoor apparatus which is corresponding to the predetermined area).

As mentioned above, the current intellectual air-conditioning system usually pre-defines the positions of each area inside the building, and presets the relationship among the indoor apparatuses, the sensors and the areas. However, if the indoor spaces of the building have a great change (for example, the building is redecorated), the manager needs to reset corresponding parameters of the algorithm of the system according to the variation of the indoor spaces in order to rebuild the relationship among each of the indoor apparatuses, each of the sensors and each of the changed areas, which is very complicated.

SUMMARY OF THE INVENTION

The main object of the present invention is to provide an area abnormality detecting system and an area abnormality detecting method, which constitute multiple areas of a space respectively by grouping a plurality of blocks having the same size, so as to easily define size, amount and position of each area of the space, and define serving areas of the space that multiple apparatuses and sensors take charge of.

The other object of the present invention is to provide an area abnormality detecting system and an area abnormality detecting method, which obtain parameters of apparatuses corresponding to an abnormal area when an abnormality occurs, so as to determine the occurring reason for the abnormality.

To achieve to above objects, an area abnormality detecting system including multiple apparatuses, multiple sensors and a detecting server is disclosed in the present invention. The system is adopted in a space, which is segmented into several blocks with the same size. Multiple areas of the space are defined by the blocks separately. The apparatuses are respectively corresponding to each area for providing environmental improving services. The sensors are respectively corresponding to each area for sensing indoor environment of each area.

When an abnormality occurs, the detecting server determines an abnormal area and an occurring time corresponding to the abnormality, and then obtains several apparatus parameters of apparatuses corresponding to the abnormal area that are recorded at the occurring time, so as to determine the occurring reason for the abnormality based on the apparatus parameters.

The present invention firstly segments the space into a plurality of blocks with same size, and defines the areas of the space by the plurality of blocks, and then relates the sensors and the apparatuses with each area which needs to be served. Therefore, when each of the areas of the space has greatly changed (redecoration for example), the system can re-define each area with the plurality of blocks quickly, and easily rebuild the relationship among the sensors, the apparatuses and the re-defined areas of the space.

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
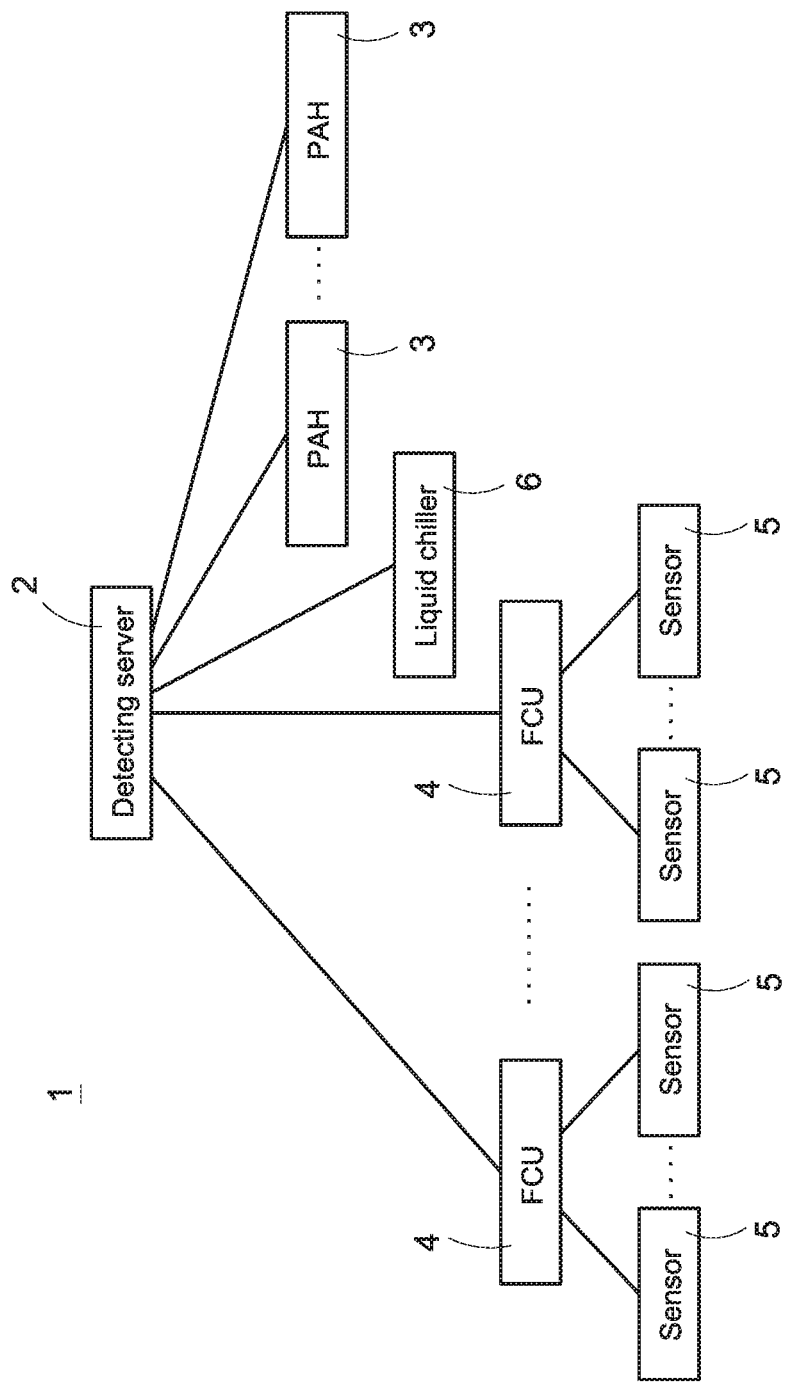
FIG. 1 is a schematic view showing system arrangement of a first embodiment according to the present invention.

FIG. 1 is a schematic view showing system arrangement of a first embodiment according to the present invention. The present invention discloses an area abnormality detecting system 1 (refers to as the system 1 hereinafter), as shown in FIG. 1, and the system 1 includes a detecting server 2, a plurality of sensors 5 and a plurality of apparatuses. In this invention, the plurality of apparatuses can be any type of apparatus, such as pre-cooling air handling unit (PAH) 3, fan coil unit (FCU) 4, liquid chiller 6, etc., of an intelligent air-conditioning system, but not limited thereto.

The detecting server 2 can directly connect with each apparatus, or alternatively connect to each PAH 3 and the liquid chiller 6 through a programmable logic controller (PLC, not shown in FIG. 1), and connect to each FCU 4 through zone controller(s) (ZC(s), not shown in FIG. 1) arranged in each area. The plurality of sensors 5 in this embodiment are arranged in each area respectively, which are connected to the FCU 4 of the same arranged area, and connected to the detecting server 2 through each connected FCU 4.

Figure 2:
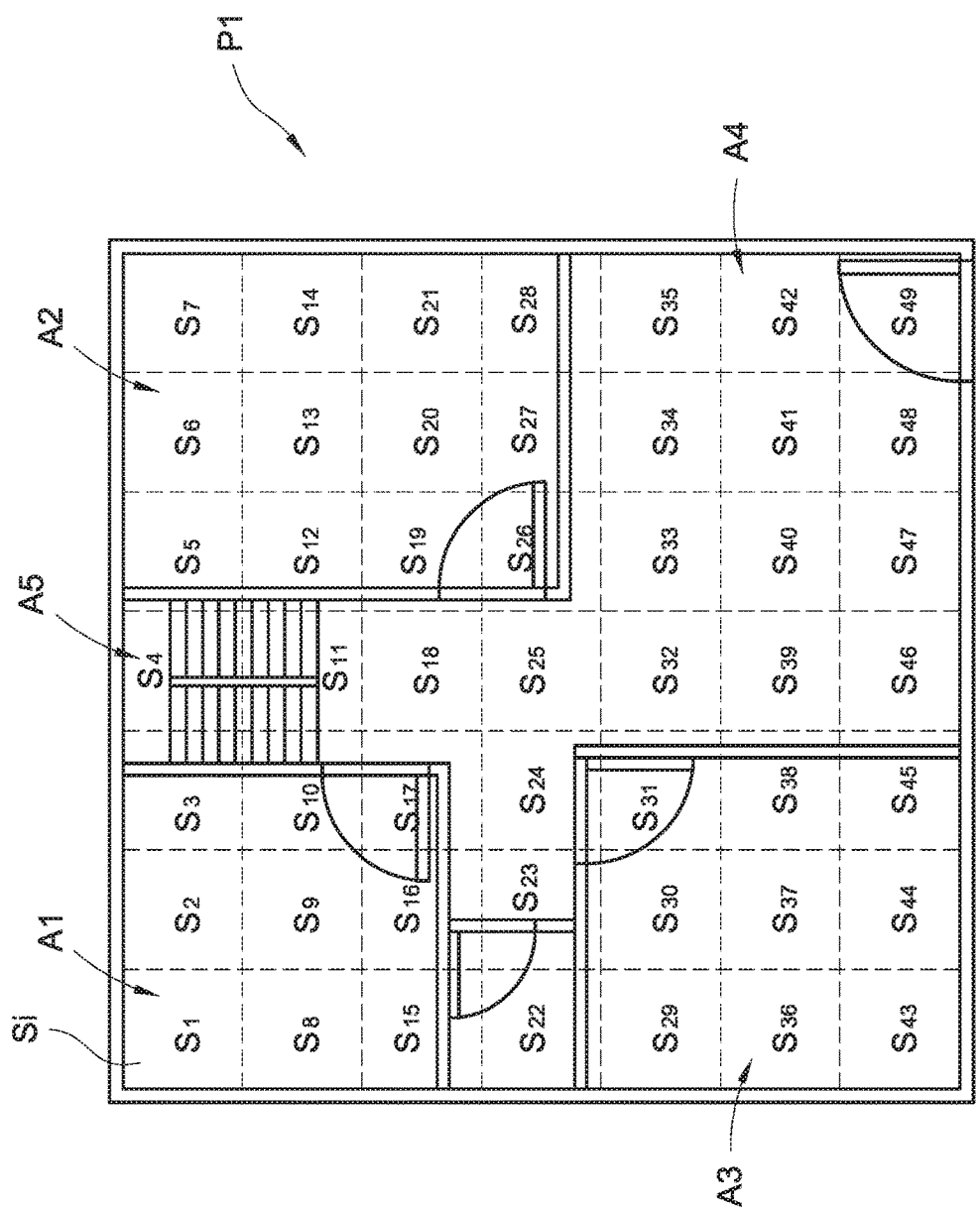
FIG. 2 is a schematic view showing blocks segment of a first embodiment according to the present invention.

The system 1 is adopted in a building (not shown), the building includes several floors, and each floor has a space (such as space P1 shown in FIG. 2). In the following description, a single space P1 will be taken as an example.

In the present invention, the detecting server 2 segments the space P1 logically into several blocks with the same size (such as blocks $S_i$ shown in FIG. 2). The space P1 is physically and generally decorated as multiple areas (such as lobby, offices, first meeting room, second meeting room, etc.), wherein each area is composed logically of different numbers of the blocks $S_i$, i.e., the detecting server 2 defines each of the areas through the combination of the plurality of blocks $S_i$.

FIG. 2 is a schematic view showing blocks segment of a first embodiment according to the present invention. In FIG. 2, the space P1 is logically segmented by the detecting server 2 into the plurality of blocks $S_i$. In particularly, the detecting server 2 segments the space P1 logically into forty-nine blocks $S_i$, i.e., $S_1$ to $S_{49}$ of the same size shown in FIG. 2. In other words, the plurality of blocks $S_i = \{S_1, S2, \ldots, S49\}$, and the size of the space P1 equals to the sum of the sizes of the plurality of blocks $S_i$.

As shown in FIG. 2, the space P1 includes a first area A1 (such as first meeting room (R-101)), a second area A2 (such as second meeting room (R-102)), a third area A3 (such as third meeting room (R-103)), a fourth area A4 (such as lobby) and a fifth area A5 (such as stairs area). In the present invention, the detecting server 2 can perform an automatic analysis algorithm, or receive a manager's setting from a human-machine interface (HMI, not shown), so as to group the plurality of blocks $S_i$ respectively into each of the areas.

More specifically, in the embodiment of FIG. 2, the detecting server 2 relates numbers of the blocks $S_1$, $S_2$, $S_3$, $S_8$, $S_9$, $S_{10}$, $S_{15}$, $S_{16}$ and $S_{17}$ with the first area A1, relates numbers of the blocks $S_5$, $S_6$, $S_7$, $S_{12}$, $S_{13}$, $S_{14}$, $S_{19}$, $S_{20}$, $S_{21}$, $S_{26}$, $S_{27}$ and $S_{28}$ with the second area A2, relates numbers of the blocks $S_{29}$, $S_{30}$, $S_{31}$, $S_{36}$, $S_{37}$, $S_{38}$, $S_{43}$, $S_{44}$ and $S_{45}$ with the third area A3, relates numbers of the blocks $S_{11}$, $S_{18}$, $S_{24}$, $S_{25}$, $S_{32}$, $S_{33}$, $S_{34}$, $S_{35}$, $S_{39}$, $S_{40}$, $S_{41}$, $S_{42}$, $S_{46}$, $S_{47}$, $S_{48}$ and $S_{49}$ with the fourth area A4, and relates the block $S_4$ with the fifth area A5.

It should be mentioned that each of the blocks $S_i$ in the present invention has a minimal size which cannot be further segmented, for example, size of 20 cm×20 cm or size of 10 cm×10 cm, and the blocks $S_i$ are not overlapped with each other. Accordingly, the operation of the system 1 is not affected even the physical size of an area is not exactly equal to the sum of the sizes of the plurality of blocks $S_i$ constituting the area. Therefore, the difficulty of setting each of the areas is reduced.

Refer to FIG. 1 again. Each of the plurality of sensors 5 is respectively corresponding to one of the areas in order to sense the indoor environment of each area and transmit sensing data back to the detecting server 2. Therefore, the detecting server 2 can monitor each area for sensing abnormality through analyzing the sensing data.

Each of the plurality of apparatuses is corresponding to each of the areas, accepts the detecting server's control to operate, and records apparatus parameters during their operation (detailed discussion in the following). More specifically, each apparatus can be corresponding to one or more areas, but not limited thereto. For example, one FCU 4 is usually corresponding to a single area, one PAH 3 is usually corresponding to multiple areas simultaneously (i.e., one PAH 3 takes charge of areas related to multiple FCUs 4), and one liquid chiller 6 is usually corresponding to all areas of the same space P1 (i.e., one liquid chiller 6 takes charge of areas related to multiple FCUs 4 and multiple PAH 3).

Figure 3:
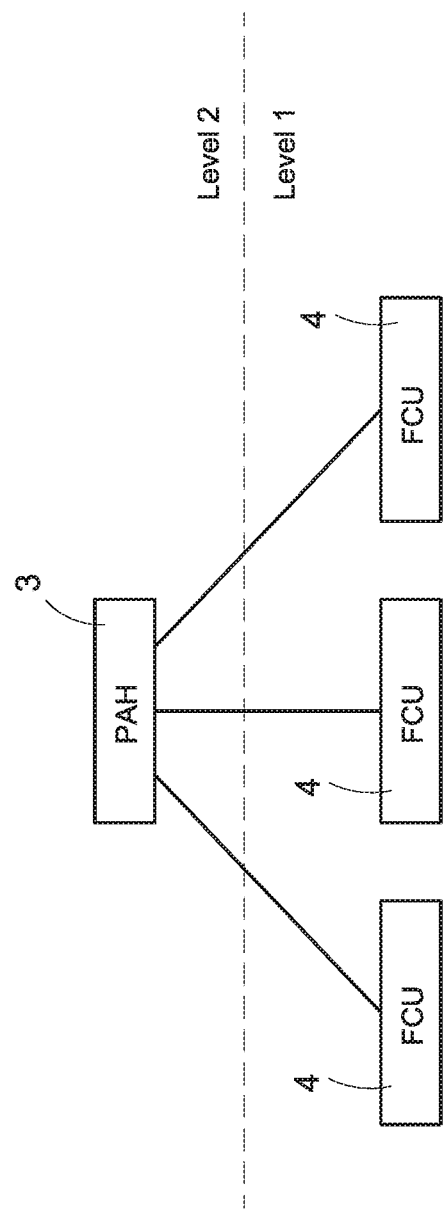
FIG. 3 is a schematic view showing apparatuses coverage of a first embodiment according to the present invention.

Please also refer to FIG. 3, a schematic view showing apparatuses coverage of a first embodiment according to the present invention. As mentioned above, different types of apparatuses can take charge of different ranges of space and are classified into different levels. As shown in FIG. 3, each of the FCUs 4 only blows air to a single area and is regarded as level 1, each of the PAHs 3 can simultaneously transmit outdoor air to multiple FCUs 4 and is regarded as level 2. In the embodiment of FIG. 3, the area related to the PAH 3 is overlapped with the areas respectively related to three of the FCUs 4 at the same time.

Figure 4:
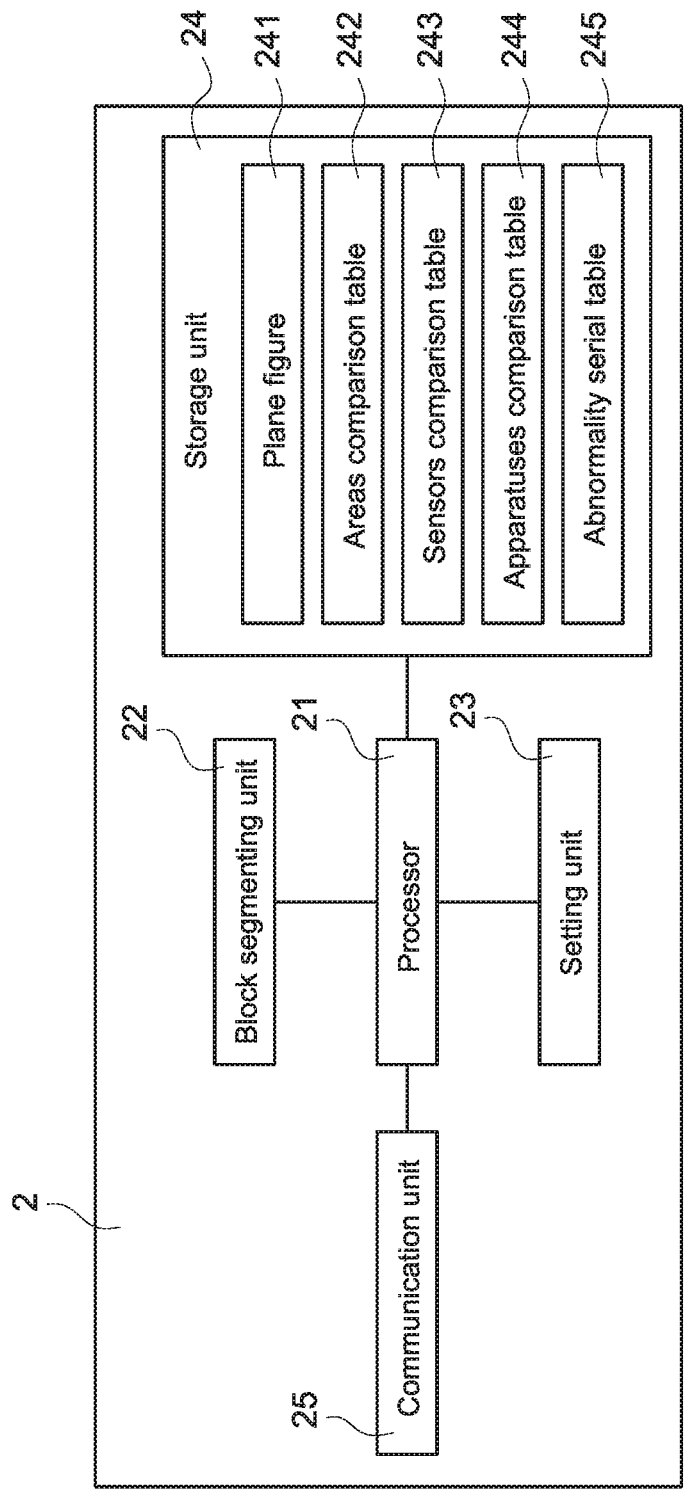
FIG. 4 is a block diagram of detecting server of a first embodiment according to the present invention.

FIG. 4 is a block diagram of detecting server of a first embodiment according to the present invention. As shown in FIG. 4, the detecting server 2 includes a processor 21, and also includes a block segmenting unit 22, a setting unit 23, a storage unit 24 and a communicating unit 25 which are all connected with the processor 21. In this embodiment, each of the units 21-25 of the detecting server 2 is implemented through hardware (such as electronic circuit or integrated circuit), or implemented through software (such as program and application programming interface (API)), but not limited thereto.

The setting unit 23 is used to set the size of the plurality of blocks $S_i$ for generating a setting value, and the block segmenting unit 22 segments the space P1 logically into the plurality of blocks $S_i$ according to the setting value of the setting unit 23. The setting unit 23 is also used to group the blocks $S_i$ respectively into each of the areas. Furthermore, the setting unit 23 is also used to relate the sensors and the apparatuses with each of the areas. In other words, the setting unit 23 sets each of the areas as a serving area (SA) where the sensors and the apparatuses take charge of.

In one embodiment, the setting step of the aforementioned setting unit 23 is automatically executed through an algorithm. In other embodiments, however, the setting unit 23 can be provided with a human-machine interface (HMI), and the setting unit 23 accepts a manager setting through the HMI. Therefore, a manager of the system 1 can manually and arbitrarily set the relationship between each of the areas and each of the blocks $S_i$, the relationship between each of the sensors 5 and each of the areas, and the relationship between each of the apparatuses and each of the areas, and the system 1 can record these information in the storage unit 24.

The communication unit 25 is connected with the sensors and the apparatuses, receives the sensing data transmitted from the sensors, and transmits control commands to the apparatuses.

The processor 21 receives the sensing data transmitted from the sensors 5 through the communication unit 25, and determines if an abnormality occurs according to the received sensing data. If determining that an abnormality occurs through analyzing the sensing data transmitted from a specific sensor of the plurality of sensors 5, the processor 21 first confirms an abnormal area and an occurring time of the abnormality, and obtains apparatus parameters of specific apparatuses corresponding to the abnormal area that are recorded at the occurring time. In this embodiment, the abnormal area indicates the area where the abnormality occurred, and the abnormal area is the serving area where the specific sensor and the specific apparatuses take charge of.

It should be mentioned that the processor 21 determines whether an abnormality occurs according to preset rules. For example, after a plurality of apparatuses of an area boot, the processor 21 continues receiving the sensing data to obtain indoor temperature of the area. If the indoor temperature of the area cannot be improved to meet a target temperature in a preset time period, the processor 21 will determine that an abnormality occurs in the area.

After receiving the apparatus parameters from the specific apparatuses, the processor 21 then determines the occurring reason for the abnormality according to the apparatus parameters. In particular, the apparatus parameters of the apparatuses include control parameters which is readable and writable, and property parameters which is only readable. The processor 21 determines, according to the control parameters and the property parameters, that the occurring reason for the abnormality to be mis-controlled of the system 1 or the manager to the apparatuses, lack of capacity of the apparatuses, or environmental problems of the abnormal area itself.

In this embodiment, the control parameters are corresponding to the control commands sent by the detecting server 2, such as the control commands for changing fan speed or valve degree of the FCUs 4, changing fan speed of the PAHs 3, etc. The property parameters are corresponding to each value of the apparatuses themselves, such as discharging temperature of the PAHs 3, power consumption of the FCUs 4, temperature of air that inhaling to the coil, etc.

The sensors may include environmental sensors for sensing environment status of each of the serving areas, and apparatus sensors for sensing apparatus status of each of the apparatuses. Each of the environmental sensors is respectively arranged in a corresponding one of the serving areas, and includes person detector (PD) for sensing if a person enters the serving areas, temperature sensor for sensing indoor temperature of the serving areas, humidity sensor for sensing indoor humidity of the serving areas, CO2 sensor for sensing CO2 quantity of the serving areas, etc. Each of the apparatus sensors is respectively arranged inside or surrounding a corresponding one of the apparatuses, and is used to sense the property parameters of the apparatus.

The storage unit 24 stores a plane figure 241, an area comparison table 242, a sensor comparison table 243 and an apparatus comparison table 244. The plane FIG. 241 records spatial data of the space P1. In particular, the block segmenting unit 22 segments the space P1 logically into the plurality of blocks $S_i$ according to the plane figure 241 and the setting value indicating the size of each of the blocks $S_i$.

The area comparison table 242 is generated after the setting unit 23 groups the plurality of blocks $S_i$ respectively into each of the areas, and the area comparison table 242 records the relationship between each of the areas and each of the blocks $S_i$. More specifically, in the embodiment shown in FIG. 2, the contents of the area comparison table 242 can be expressed as below:

| Area Comparison Table | |
|---|---|
| Area | Blocks $S_i$ |
| First Area (R-101) | $S_1, S_2, S_3, S_8, S_9, S_{10}, S_{15}, S_{16}, S_{17}$ |
| Second Area (R-102) | $S_5, S_6, S_7, S_{12}, S_{13}, S_{14}, S_{19}, S_{20}, S_{21}, S_{26}, S_{27}$ and $S_{28}$ |
| Third Area (R-103) | $S_{29}, S_{30}, S_{31}, S_{36}, S_{37}, S_{38}, S_{43}, S_{44}$ and $S_{45}$ |
| Fourth Area (Lobby) | $S_{11}, S_{18}, S_{24}, S_{25}, S_{32}, S_{33}, S_{34}, S_{35}, S_{39}, S_{40}, S_{41}, S_{42}, S_{46}, S_{47}, S_{48}$ and $S_{49}$ |
| Fifth Area (Stairs Area) | $S_4$ |

The technical effect which can be achieved by the present invention through grouping the plurality of blocks $S_i$ respectively to constitute each of the areas is that a new area can be easily re-defined through the plurality of blocks $S_i$ whenever the space P1 has greatly changed (such as redecorated) and causes the variation of sizes, numbers and positions of the areas in the space P1, and the algorithm adopted by the detecting server 2 does not need to be modified additionally. Therefore, the cost of both money and time for adjusting the system 1 can be greatly saved.

The sensor comparison table 243 is generated after the setting unit 23 relates the plurality of sensors 5 respectively to each of the serving areas, and the sensor comparison table 243 records the relationship between each of the sensors 5 and each of the serving areas. Also, if the sensors 5 include the aforementioned apparatus sensors, then the sensor comparison table 243 further records the relationship between each of the sensors 5 and each of the apparatuses. More specifically, in the embodiment shown in FIG. 5A, the contents of the sensor comparison table 243 can be expressed as below:

| Sensor Comparison Table | | |
|---|---|---|
| Sensors | Serving Areas | Data Properties |
| Sensor-T1 | R-101 | Temp |
| Sensor-C1 | R-101 | CO2 Quantity |
| Sensor-T2 | R-102 | Temp |
| Sensor-C2 | R-102 | CO2 Quantity |
| Sensor-T3 | Lobby | Temp |
| Sensor-C3 | Lobby | CO2 Quantity |
| Sensor-T4 | Lobby | Temp |
| Sensor-C4 | Lobby | CO2 Quantity |
| Sensor-T5 | R-103 | Temp |
| Sensor-C5 | R-103 | CO2 Quantity |
| Sensor-T6 | Air Intake of PAH-01 | Inhaling Air Temp |
| Sensor-T7 | Air Outlet of PAH-01 | Discharging Air Temp |

Figure 5A:
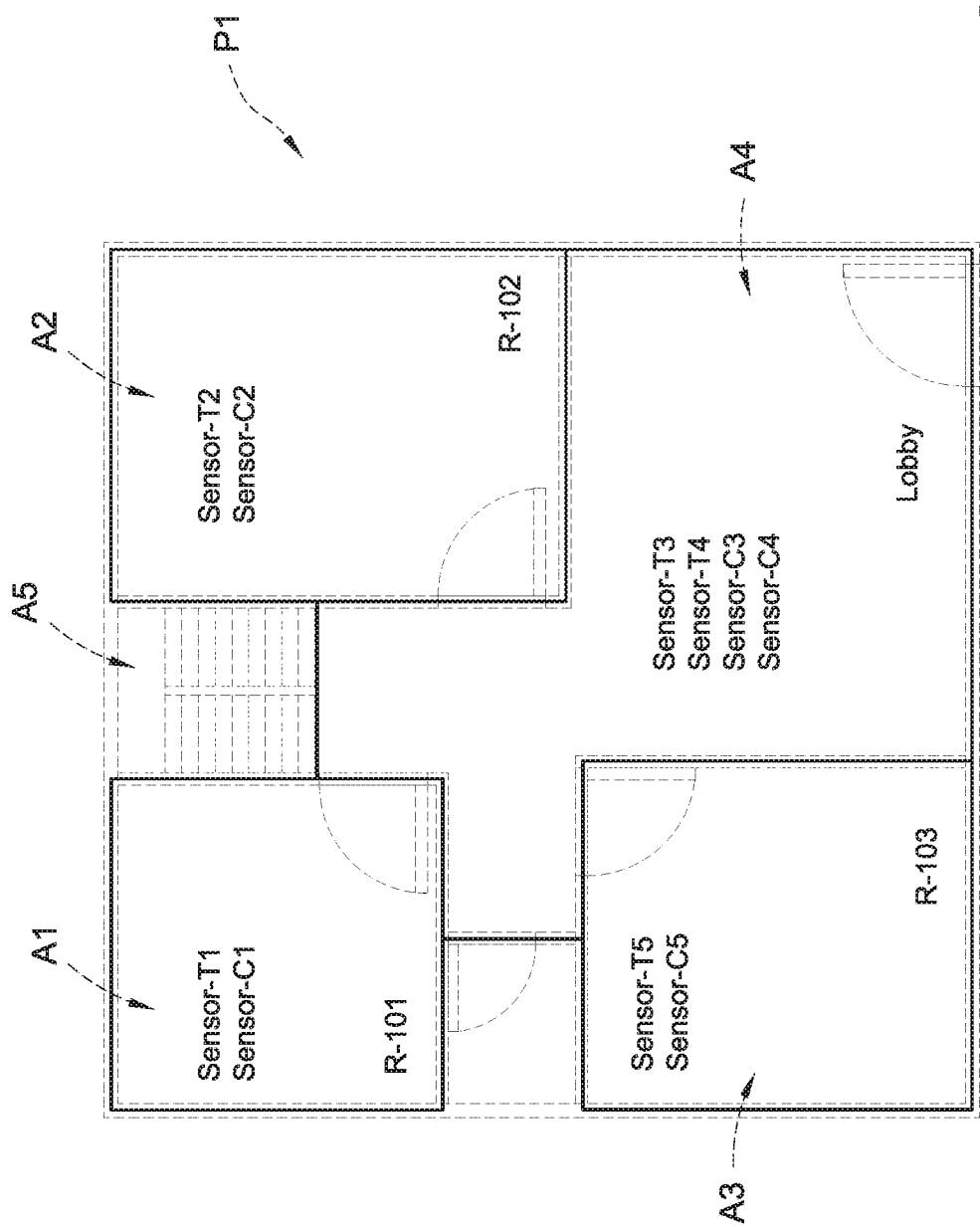
FIG. 5A is a schematic view showing sensor serving areas of a first embodiment according to the present invention.

FIG. 5A is a schematic view showing sensor serving areas of a first embodiment according to the present invention. In the embodiment of FIG. 5A, the serving area of sensor-T1 and sensor-C1 is the first meeting room R-101, the serving area of sensor-T2 and sensor-C2 is the second meeting room R-102, the serving area of sensor-T3, sensor-T4, sensor-C3 and sensor-C4 is lobby, and the serving area of sensor-T5 and sensor-C5 is the third meeting room R-103. Specifically, sensors T1 to T5 are temperature sensors and the data properties of sensors T1 to T5 are temperatures (Temp), and sensors C1 to C5 are CO2 sensors and the data properties of sensor C1 to C5 are CO2 quantities.

In this embodiment, sensor-T6 and sensor-T7 are apparatus sensors, which are respectively arranged surrounding PAH-01 (not shown in FIG. 5A). Both sensor-T6 and sensor-T7 are for temperature (i.e., temperature sensors), wherein the data property of sensor-T6 is inhaling air temperature of PAH-01, and the data property of sensor-T7 is discharging temperature of PAH-01. That is to say, the serving area of sensor-T6 is the air intake of PAH-01, and the serving area of sensor-T7 is the outlet of PAH-01. However, the above description is just an embodiment, not intended to limit the scope of the present invention.

The apparatus comparison table 244 is generated after the setting unit 23 relates the plurality of apparatuses respectively to each of the serving areas, and the apparatus comparison table 244 records the relationship between each of the apparatuses and each of the serving areas. Also, the apparatus comparison table 244 further records the covering relations among all of the apparatuses.

In this embodiment, several apparatuses at least include multiple PAHs 3 and multiple FCUs 4, wherein every PAH 3 covers at least one FCU 4. In particularly, if a specific PAH covers a specific FCU, it means parts of the serving area of the specific PAH is overlapped with the serving area of the specific FCU.

More specifically, in the embodiment shown in FIG. 5B and FIG. 5C, the contents of the apparatus comparison table 244 can be expressed as below:

| Apparatus Comparison Table | | |
|---|---|---|
| Apparatuses | Serving Areas | Covering Relations |
| FCU-01 | R-101 | PAH-01 |
| FCU-02 | R-102 | PAH-01 |
| FCU-03 | Lobby | PAH-02 |
| FCU-04 | Lobby | PAH-02 |
| FCU-05 | R-103 | PAH-02 |
| PAH-01 | R-101, R-102 | Liquid Chiller |
| PAH-02 | R-103, Lobby | Liquid Chiller |
| Liquid Chiller | R-101, R-102, R-103, Lobby | none |

Figure 5B:
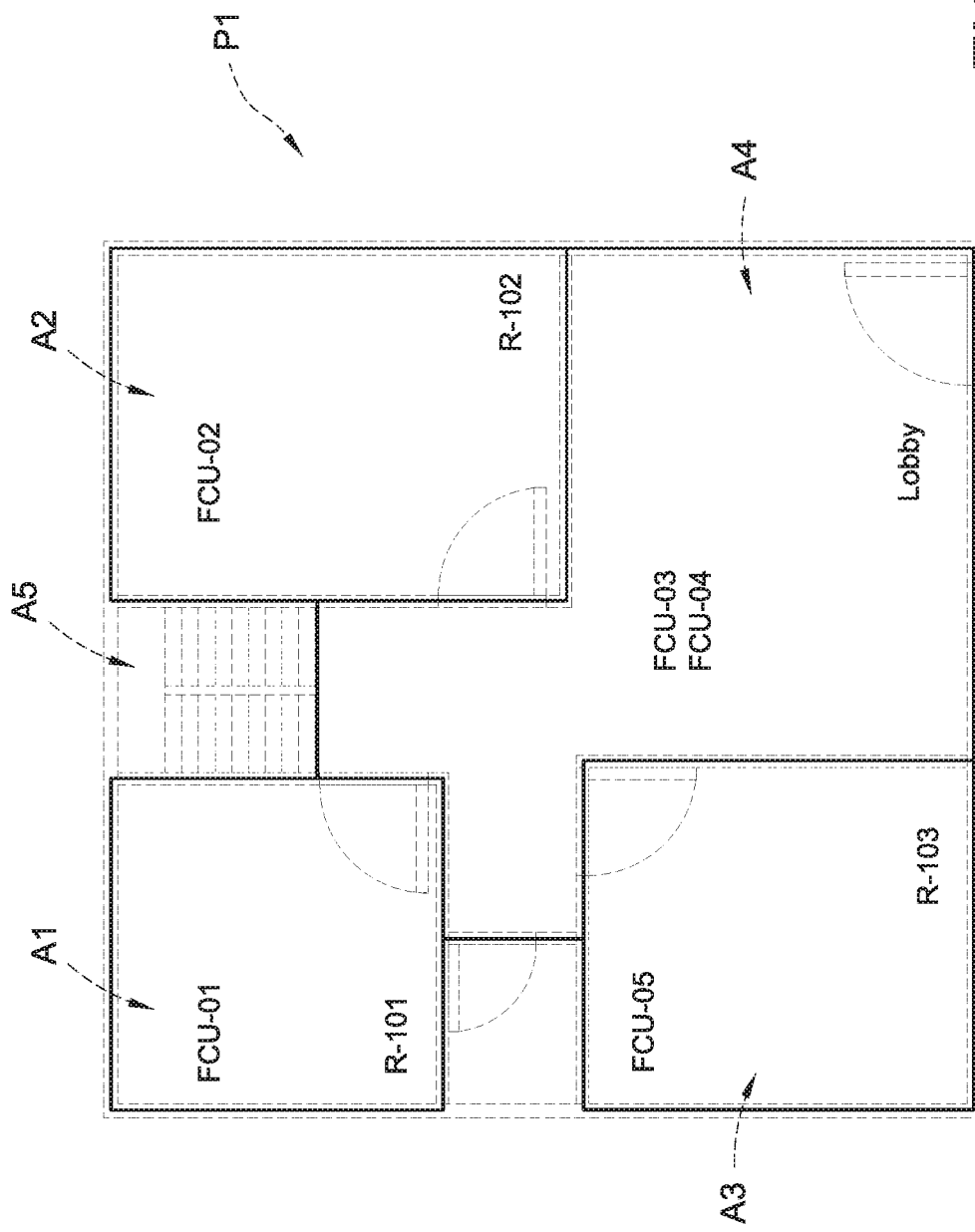
FIG. 5B is a schematic view showing FCU serving areas of a first embodiment according to the present invention.
Figure 5C:
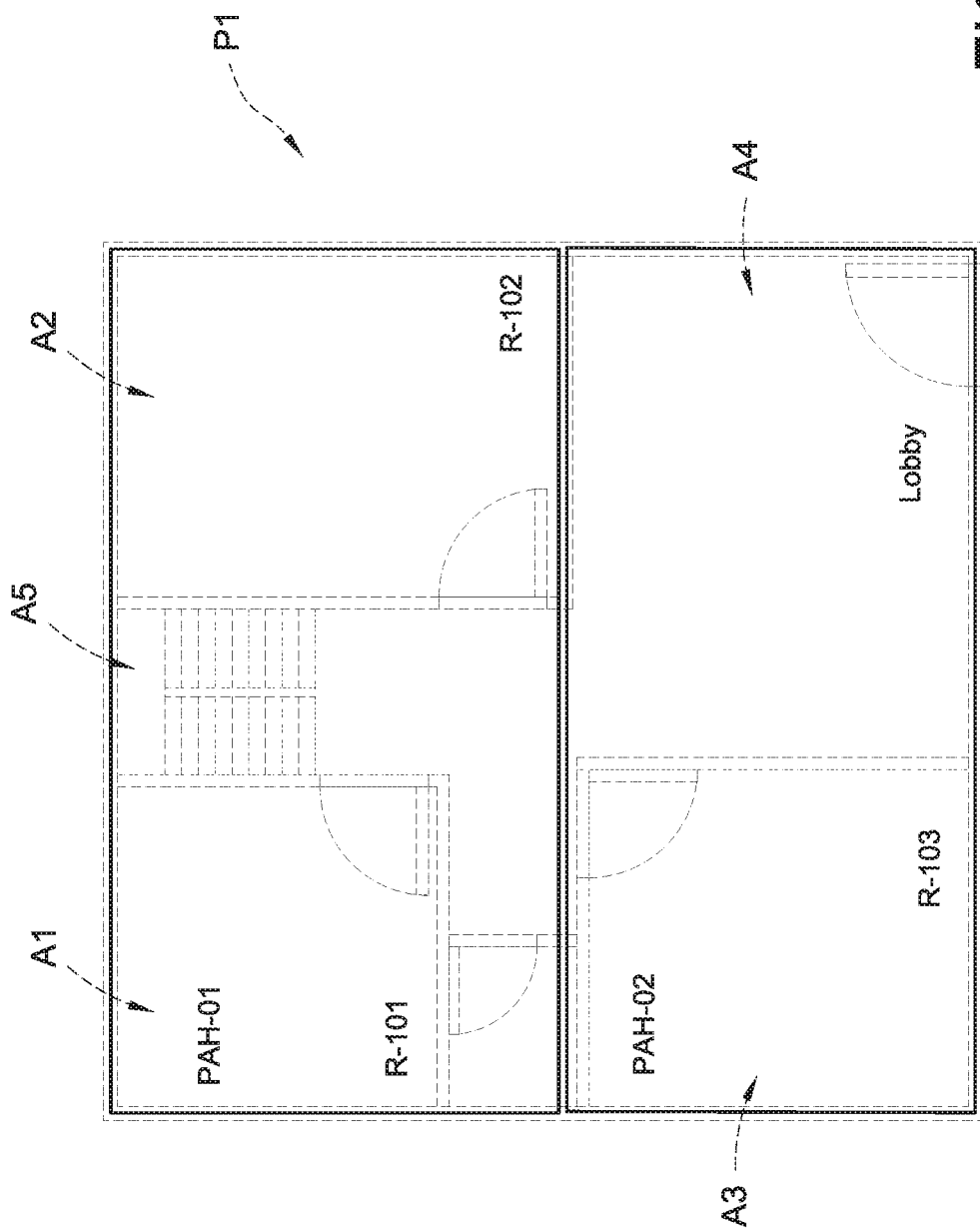
FIG. 5C is a schematic view showing FCU serving areas of a first embodiment according to the present invention.

FIG. 5B is a schematic view showing FCU serving areas of a first embodiment according to the present invention, and FIG. 5C is a schematic view showing FCU serving areas of a first embodiment according to the present invention. In the embodiment of FIG. 5B, the serving area of FCU-01 is the first meeting room R-101 and is covered by PAH-01. The serving area of FCU-02 is the second meeting room R-102 and is covered by PAH-01. The serving area of FCU-03 and FCU-04 is lobby and is covered by PAH-02. The serving area of FCU-05 is the third meeting room R-103 and is covered by PAH-02.

In the embodiment of FIG. 5C, the serving area of PAH-01 is the first meeting room R-101 and the second meeting room R-102, and the serving area of PAH-02 is the third meeting room R-103 and lobby. Also, both of the serving areas of PAH-01 and PAH-02 are covered with the liquid chiller 6. According to the apparatus comparison table 244, the serving area of the liquid chiller 6 covers all areas inside the space P1, i.e., it covers the first meeting room R-101, the second meeting room R-102, the third meeting room R-103 and lobby at the same time.

Figure 6:
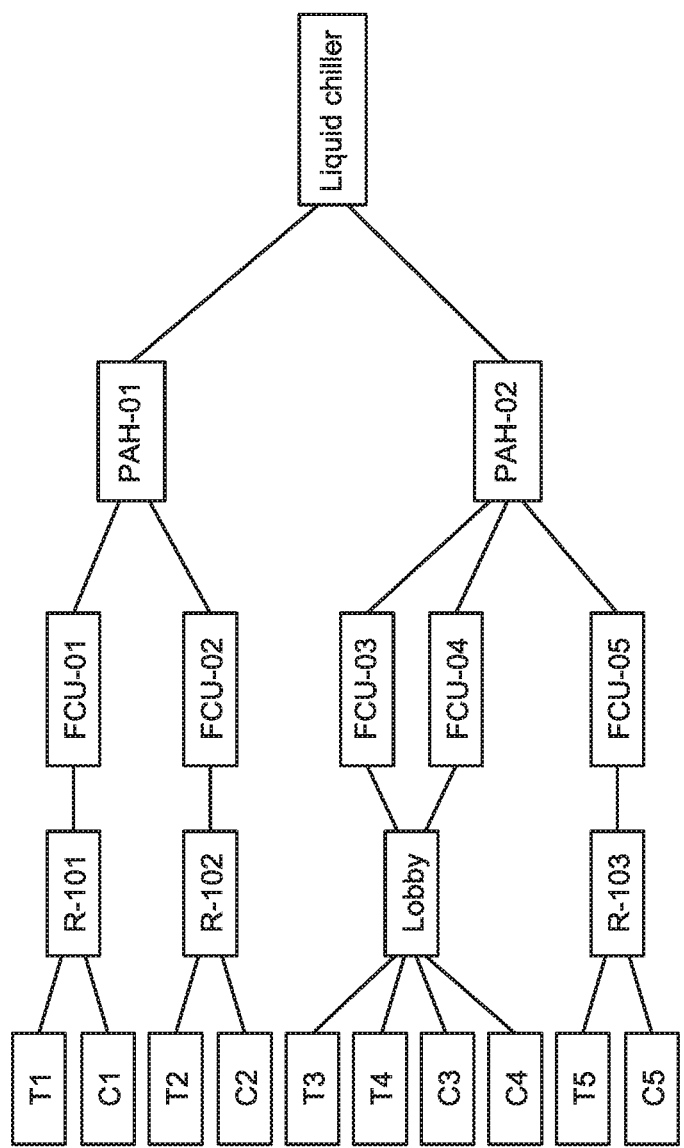
FIG. 6 is a relationship tree diagram of a first embodiment according to the present invention.

FIG. 6 is a relationship tree diagram of a first embodiment according to the present invention. According to the area comparison table 242, the sensor comparison table 243, the apparatus comparison table 244 and the contents disclosed in FIG. 5A to FIG. 5C, the detecting server 2 can automatically generate the tree diagram shown in FIG. 6. Previously and generally, the liquid chiller 6 covers the serving areas of each of the FCUs 4 and each of the PAHs 3 at the same time, and directly drains icy water to each of the FCUs 4 and each of the PAHs 3. What is disclosed in FIG. 6 is just the tree figure showing the covering relations among these apparatuses 3, 4 and 6, but not the diagram showing the actual connecting relations among these apparatuses 3, 4 and 6.

As shown in FIG. 6, the serving area of sensor-T1, sensor-C1 and FCU-01 is the first meeting room R-101, and the first meeting room R-101 is covered with PAH-01. The serving area of sensor-T2, sensor-C2 and FCU-02 is the second meeting room R-102, and the second meeting room R-102 is covered with PAH-01. The serving area of sensor-T3, sensor-T4, sensor-C3, sensor-C4, FCU-03 and FCU-04 is lobby, and the lobby is covered with PAH-02. The serving area of sensor-T5, sensor-C5 and FCU-05 is the third meeting room R-103, and the third meeting room R-103 is covered with PAH-02. Also, both of PAH-01 and PAH-02 are covered with the liquid chiller 6.

In particularly, the detecting server 2 determines whether an abnormality occurs in the first meeting room R-101 according to the sensing data of sensor-T1 and sensor-C1. When the abnormality is determined to occur in the first meeting room R-101, the detecting server 2 obtains the apparatus parameters from FCU-01, PAH-01 and the liquid chiller 6 in order to determine the occurring reason for the abnormality.

The detecting server 2 determines whether an abnormality occurs in the second meeting room R-102 according to the sensing data of sensor-T2 and sensor-C2. When the abnormality is determined to occur in the second meeting room R-102, the detecting server 2 obtains the apparatus parameters from FCU-02, PAH-01 and the liquid chiller 6 in order to determine the occurring reason for the abnormality.

The detecting server 2 determines whether an abnormality occurs in lobby according to the sensing data of sensor-T3, sensor-T4, sensor-C3 and sensor-C4. When the abnormality is determined to occur in lobby, the detecting server 2 obtains the apparatus parameters from FCU-03, FCU-04, PAH-02 and the liquid chiller 6 in order to determine the occurring reason for the abnormality.

The detecting server 2 determines whether an abnormality occurs in the third meeting room R-103 according to the sensing data of sensor-T5 and sensor-C5. When the abnormality is determined to occur in the third meeting room R-103, the detecting server 2 obtains the apparatus parameters from FCU-05, PAH-02 and the liquid chiller 6 in order to determine the occurring reason for the abnormality.

Refer to FIG. 4 again. The storage unit 24 further stores an abnormality serial table 245. The detecting server 2 continues receiving the sensing data from the sensors 5, and updates the abnormality serial table 245 regularly according to the received sensing data. In particularly, the detecting server 2 sets a flag in a corresponding column of the abnormality serial table 245 as "0" if it determines no abnormality occurs based on the sensing data, and sets the flag in the corresponding column of the abnormality serial table 245 as "1" if it determines an abnormality does occur based on the sensing data.

In particularly, when setting the flag as "1", the detecting server 2 simultaneously records the abnormal area and the occurring time of the abnormality in the corresponding column of the abnormality serial table 245.

In this embodiment, the abnormality serial table 245 can help the detecting server 2 to gather the time periods that the abnormalities respectively occur in each area, and assists the detecting server 2 to generate a time distributed diagram. Therefore, the time distributed diagram is beneficial to the detecting server 2 to determine whether the occurring reason for a determined abnormality is related to environment, time or outdoor climate.

Figure 7:
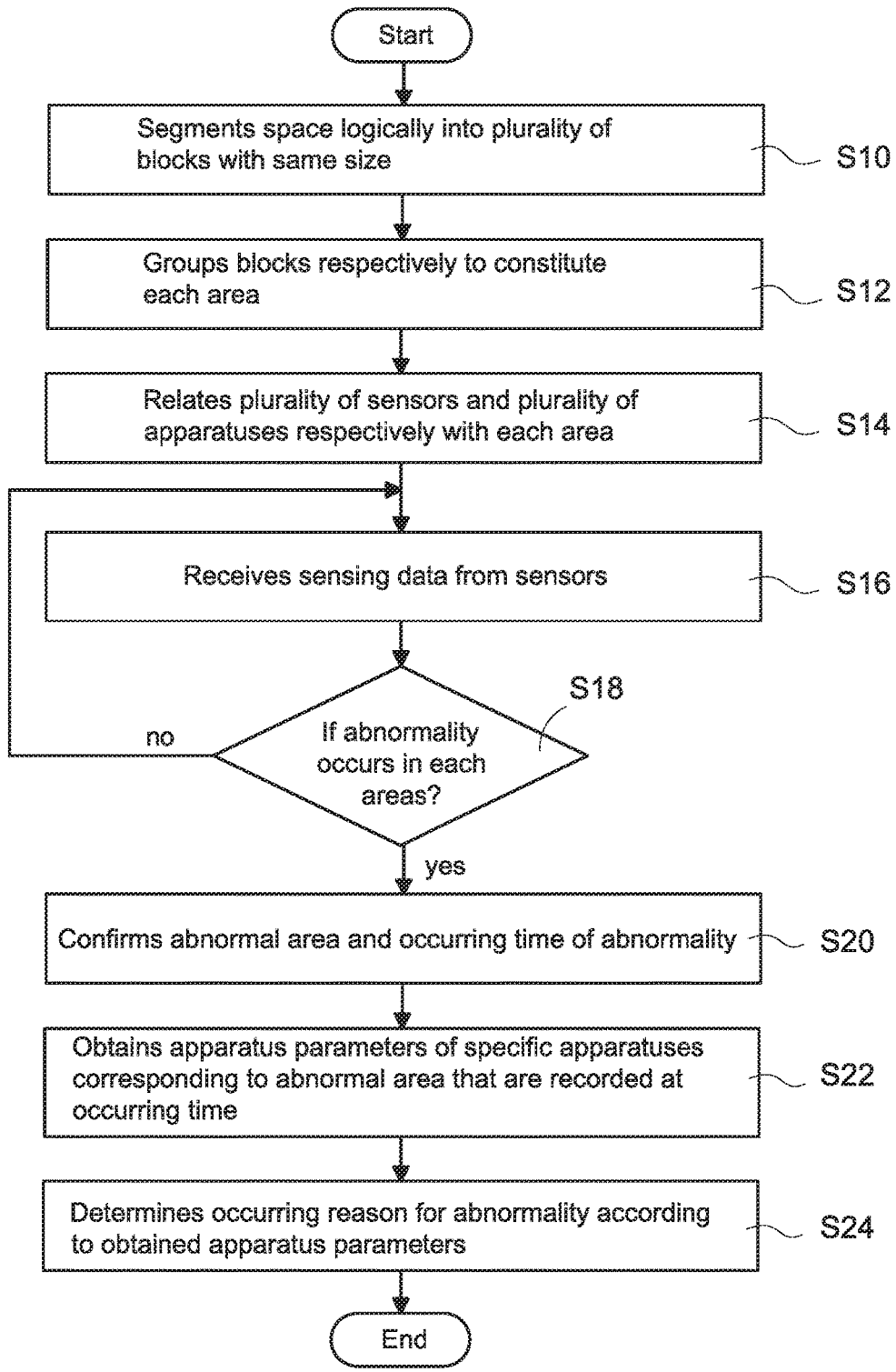
FIG. 7 is an abnormality detecting flowchart of a first embodiment according to the present invention.

FIG. 7 is an abnormality detecting flowchart of a first embodiment according to the present invention. The present invention further discloses an area abnormality detecting method (refers to as the method hereinafter); the method is adopted in the aforementioned system 1, and includes the following steps.

First, the system 1 segments the space P1 logically into the plurality of blocks $S_i$ with the same size (step S10). Next, it groups the blocks $S_i$ respectively to constitute each of the plurality of areas (step S12), and relates the plurality of sensors 5 and the plurality of apparatuses (such as the FCUs 4 and the PAHs 3) respectively with each of the areas (step S14).

After completing the setting of the areas, the sensors 5 and the apparatuses, the system 1 is ready to operate. Next, the system 1 continues receiving the sensing data transmitted from the sensors 5 during the operation (step S16), wherein the sensing data transmitted by each sensor 5 is corresponding to the serving area taken charge by the sensor 5. Also, according to the contents of the sensing data (for example, the sensing data indicates a person enters one of the serving areas), each of the apparatuses can accept control of the system 1 to operate for the corresponding serving area(s), and records its own apparatus parameters when operating.

Next, the system 1 determines if an abnormality occurs in each of the areas according to the sensing data transmitted from each of the sensors (step S18). If there is no determined abnormality, the system 1 goes back to the step S14 and continues receiving the sensing data and detecting the occurrence of abnormality.

If the system 1 determines an abnormality occurs according to the sensing data, the system 1 first confirms an abnormal area and an occurring time of the abnormality (step S20). In this embodiment, the system 1 determines the abnormality occurs according to the sensing data transmitted from a specific sensor of the plurality of sensors 5, and the abnormal area is the specific sensor's serving area. The occurring time is the time the abnormality occurred, and it can include year, month, day, hours, minute and second, but not limited thereto.

After confirming the abnormal area and the occurring time, the system 1 further obtains the apparatus parameters of specific apparatuses corresponding to the abnormal area that are recorded at the occurring time (step S22). In this embodiment, the abnormal area is the serving area of the specific apparatuses, and the specific apparatuses can include the FCU(s) 4, the PAH(s) 3 and the liquid chiller 6, but not limited thereto.

The aforementioned serving areas represent target areas where the apparatuses provide the environmental improving services for, but the entities of the apparatuses are not necessary to be arranged inside the serving areas. Moreover, these apparatuses can be arranged out of the space P1 (for example, in the outside or the basement of the building), but not limited thereto. After the step S22, the system 1 can determine the occurring reason for the abnormality according to the obtained apparatus parameters (step S24).

It should be mentioned that the aforementioned apparatus comparison table 244 further records arranged areas of each of the apparatuses, therefore, whenever the system 1 determines the occurring reason for the abnormality is that one of the apparatuses lacks of capacity, it can obtain the arranged area of the apparatus from the apparatus comparison table 244 and asks staffs to go to the arranged area for maintaining or replacing the apparatus. Also, if the arranged area is located inside the space P1, the system 1 can define the arranged area through the plurality of blocks $S_i$.

Figure 8:
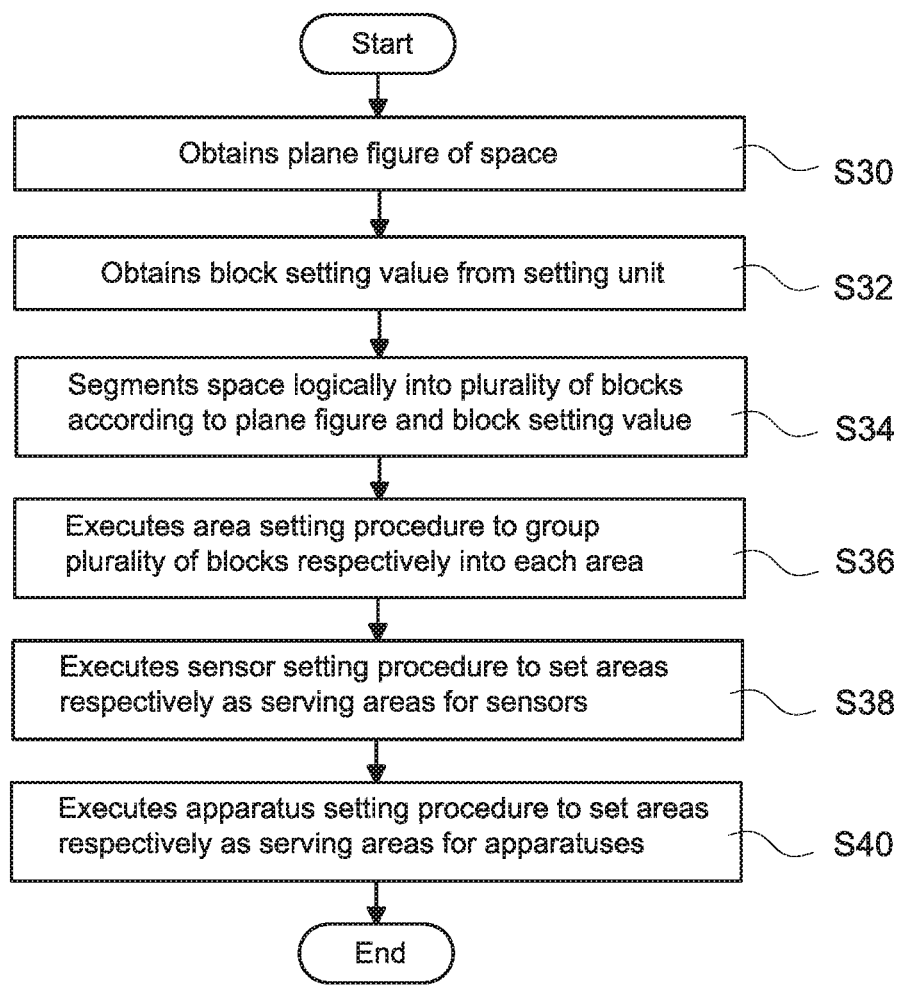
FIG. 8 is an area relating flowchart of a first embodiment according to the present invention.

FIG. 8 is an area relating flowchart of a first embodiment according to the present invention. When performing the logical segment to the space P1, the system 1 first obtains the plane figure 241 of the space P1 from the storage unit 24 (step S30), and obtains a block setting value from the setting unit 23 (step S32), wherein the block setting value is the size that is set for the plurality of blocks $S_i$. Therefore, the system 1 segments the space P1 logically into the plurality of blocks $S_i$ according to the plane FIG. 241 and the block setting value (step S34). In the embodiment, each of the plurality of blocks $S_i$ respectively has a minimal size which cannot be further segmented, and they are not overlapped with each other.

When defining each of the areas, the system 1 mainly executes an area setting procedure, so as to group the plurality of blocks $S_i$ respectively into each of the areas (step S36). When defining the serving areas respectively for each of the sensors, the system 1 mainly executes a sensor setting procedure, so as to set the areas respectively as the serving areas for each of the sensors (step S38). When defining the serving areas respectively for each of the apparatuses, the system 1 mainly executes an apparatus setting procedure, so as to set the areas respectively as the serving areas for each of the apparatuses (step S40).

It should be mentioned that in the step S36, the system 1 generates the area comparison table 242 through the execution of the area setting procedure, and stores the area comparison table 242 to the storage unit 24. In the embodiment, the area comparison table 242 records the relationship between each of the areas and each of the blocks $S_i$ which is set by the execution of the area setting procedure. In the steps S38 and step S40, the system 1 generates the sensor comparison table 243 and the apparatus comparison table 244 through the execution of the sensor setting procedure and the apparatus setting procedure, and stores these two tables 243 and 244 to the storage unit 24. In the embodiment, the sensor comparison table 243 records the relationship between the sensors 5 and their serving areas which is set by the execution of the sensor comparison table 243, and the apparatus comparison table 244 records the relationship between the apparatuses and their serving areas, which is set by the execution of the apparatus comparison table 244.

Figure 9:
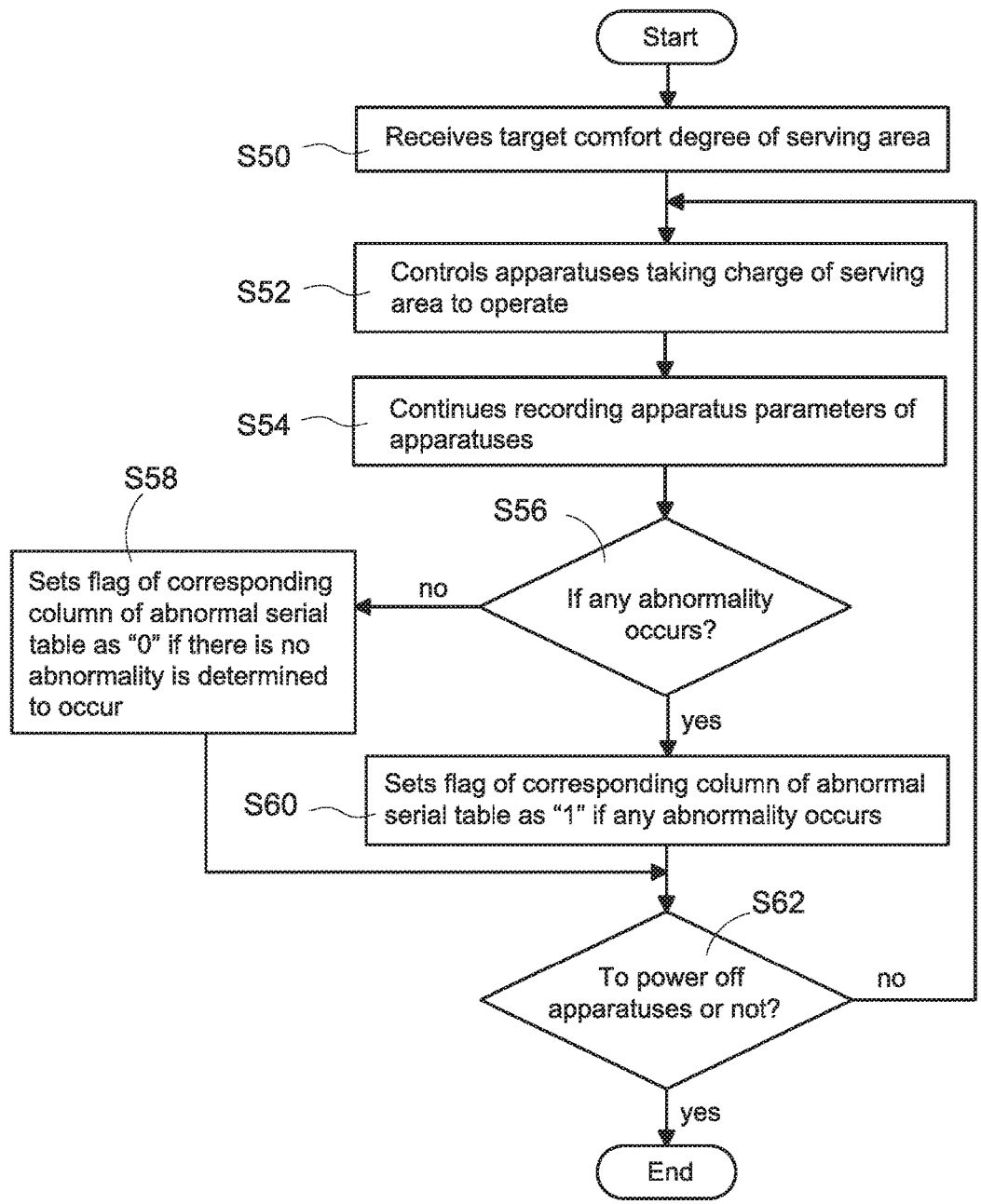
FIG. 9 is an abnormality recording flowchart of a first embodiment according to the present invention.

FIG. 9 is an abnormality recording flowchart of a first embodiment according to the present invention. When a person is detected to enter any of the serving areas, the system 1 can receive a target comfort degree of the entered serving area (step S50). In particularly, a person detector inside the serving area will notify the system 1 whenever it detects a person enters the serving area, and then the system 1 can further receive the target comfort degree. In the embodiment, the target comfort degree is set manually by the person who enters the serving area, or is a default value preset by the system 1 or the manager of the system 1, but not limited thereto.

After receiving the target comfort degree, the system 1 controls the apparatuses which take charge of the serving area to operate (step S52), so as to provide the environmental improving services for the serving area. Therefore, the system 1 makes the indoor environment of the serving area can meet the target comfort degree in a preset time period. In this embodiment, the target comfort degree can be, for example, target temperature, target humidity, target $CO_2$ quantity or target comfort index (or so called predicted mean vote (PMV)), but not limited thereto. Also, each of the apparatuses continues recording its own apparatus parameters when operating (step S54).

The system 1 continues receiving the sensing data from the sensors 5 after the apparatuses are operating, and the system 1 determines if any abnormality occurs according to the received sensing data (step S56). In particularly, the system 1 in this embodiment is to determine if any abnormality occurs in one or more serving areas having the target comfort degree, but not limited.

The system 1 updates the abnormal serial table 245 regularly according to the sensing data, sets the flag of the corresponding column of the abnormal serial table 245 as "0" if there is no abnormality is determined to occur (step S58), and sets the flag of the corresponding column of the abnormal serial table 245 as "1" if any abnormality occurs (step S60). After updating the abnormal serial table 245, the system 1 determines to power off the apparatuses or not (step S62). In particularly, the system 1 determines to power off the apparatuses or not according to the condition whether the person inside the serving area is leaving or not. Also, the system 1 re-executes the step S52 to the step S60 before the apparatuses are not powered off, so as to continue detecting the abnormality and updating the abnormal serial table 245.

Figure 10:
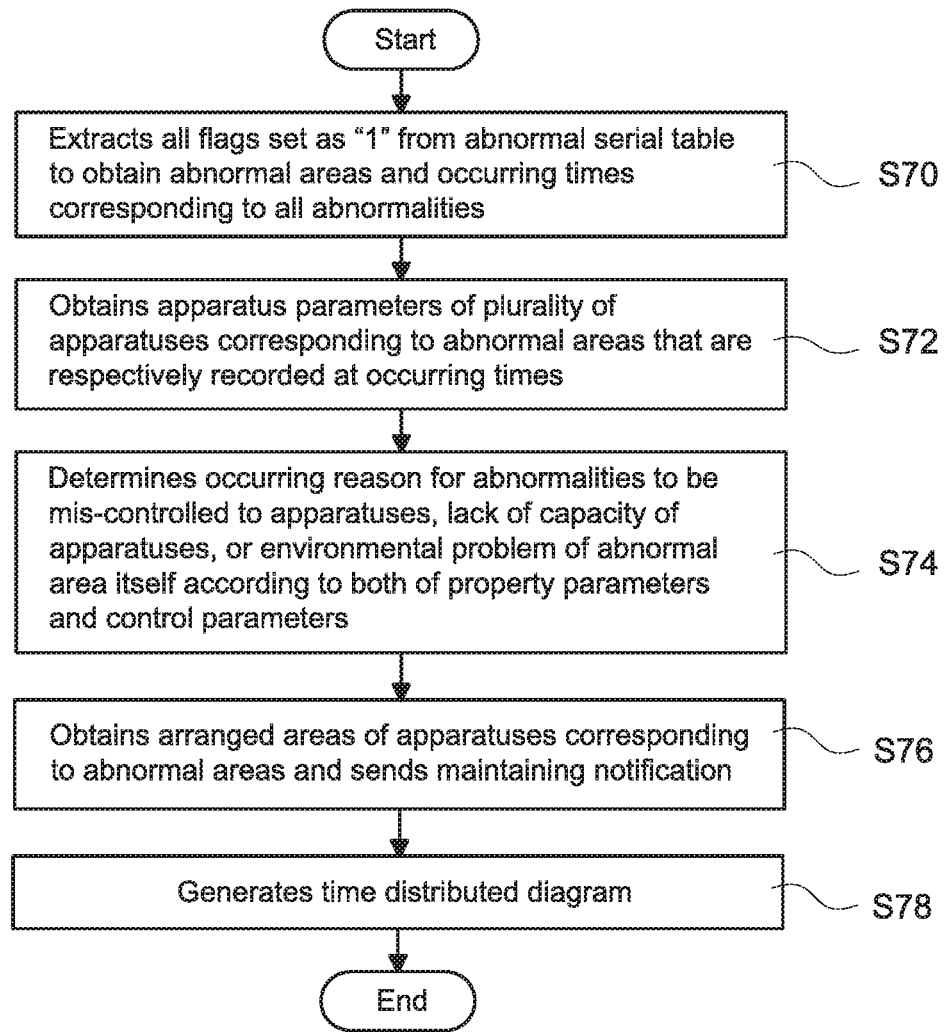
FIG. 10 is an abnormality processing flowchart of a first embodiment according to the present invention.

FIG. 10 is an abnormality processing flowchart of a first embodiment according to the present invention. When the system 1 (or the manager of the system 1) needs to analyze the abnormalities of the space P1, it can extract all the flags that have been set as "1" from the abnormal serial table 245, so as to obtain the abnormal areas and the occurring times corresponding to all of the abnormalities (step S70). Next, it can obtain the apparatus parameters of the plurality of apparatuses corresponding to the abnormal areas that are respectively recorded at the occurring times (step S72).

As mentioned above, the apparatus parameters may include the control parameters which are readable and writable, and the property parameters which are only readable. In this embodiment, the system 1 determines the occurring reason for the abnormalities to be mis-controlled of the system 1 or the manager to the apparatuses, lack of capacity of the apparatuses (for example, the apparatuses are too old, or the amount of the apparatuses in the area is not enough), or the environmental problem of the abnormal area itself (for example, windows are opened, or a high temperature machine is using) according to both of the property parameters and the control parameters (step S74).

In particularly, if the apparatus comparison table 244 records the arranged areas of each of the apparatuses, the system 1 can obtain the arranged areas of the apparatuses corresponding to the abnormal areas when determining that the occurring reason for the abnormalities is the problems of the apparatuses, and then sends a maintaining notification according to the arranged areas (step S76). Therefore, the staffs can go to the arranged areas to maintain, update or replace for each of the apparatuses.

Also, the system 1 can obtain all the flags that have been set as "1" from the abnormal serial table 245 to obtain the occurring times respectively corresponding to all of the abnormalities, so as to generate the time distributed diagram thereupon (step S78). According to the time distributed diagram, the manager can be easily notified the regular occurring time of the abnormalities, so as to determine the occurring reason for each abnormality. For example, if an abnormality usually occurs in the first meeting room on Monday PM. 3:00, in this case, the abnormality may occur because too many people are regularly there in the first meeting room on Monday PM. 3:00.

It should be mentioned that the system 1 in the present invention is to input the operating status of the apparatuses and the current indoor environment of the corresponding serving area into a self-defined rules, so as to determine whether an abnormality occurs in the serving area. For an instance, the self-defined rules can set a condition that the abnormality is regarded to occur when indoor temperature of the serving area cannot meet a tarter temperature in five minutes after the PAH 3 is booted, and then a corresponding flag of the abnormal serial table 245 will be set as "1".

Figure 11:
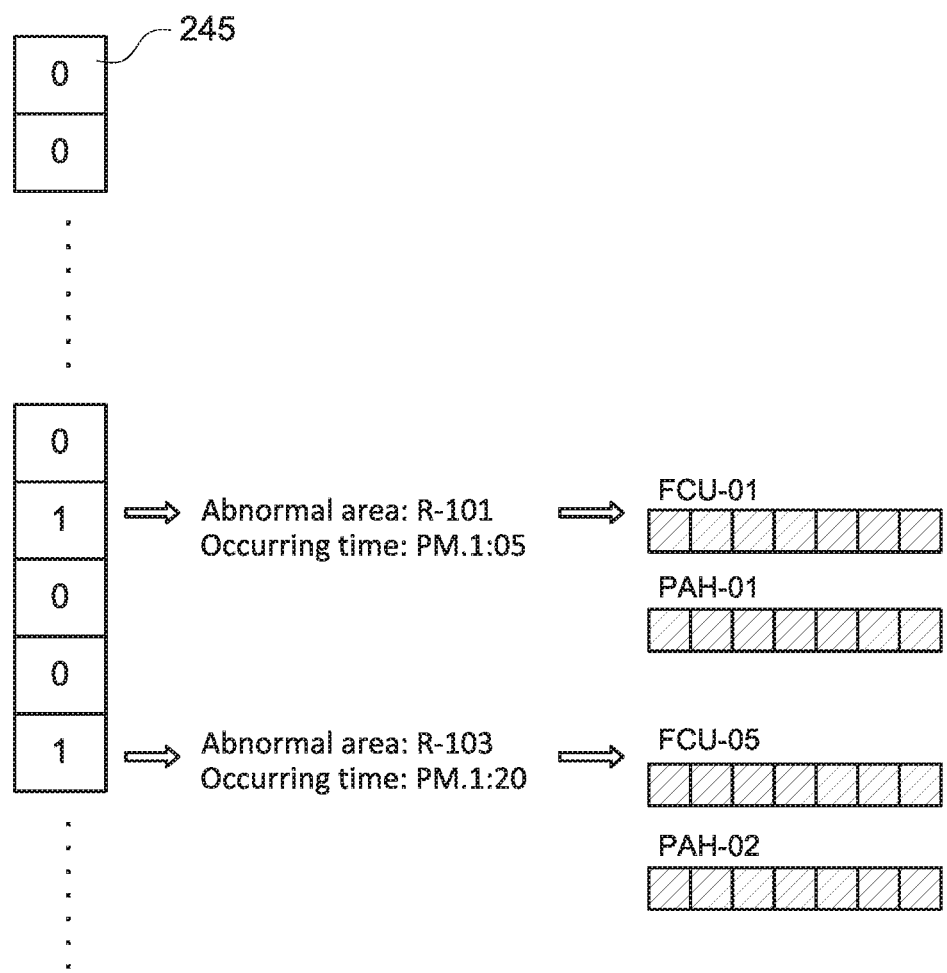
FIG. 11 is a schematic view showing abnormality serial table of a first embodiment according to the present invention.

FIG. 11 is a schematic view showing abnormality serial table of a first embodiment according to the present invention. The system 1 updates the abnormal serial table 245 regularly (once in every five minutes, for example), according to the sensing data transmitted from the sensors 5. When an abnormality occurs, the system 1 sets a flag in a corresponding column of the abnormal serial table 245 as "1". In particularly, the system 1 also records both the abnormal area and the occurring time of the abnormality in the corresponding column, wherein the abnormal area is the serving area taken charge by the specific sensor that transmits the sensing data, and the occurring time is the transmitting time of the sensing data.

Takes an example that is shown in FIG. 11, when the system 1 needs to generate the time distributed diagram, or the manager of the system 1 needs to understand the situation of the space P1, two abnormalities recorded in the abnormal serial table 245 can be obtained. In this example, the abnormal area of a first one of the two abnormalities is the first meeting room R-101, and the occurring time of the first abnormality is PM 1:05. The abnormal area of a second one of the two abnormalities is the third meeting room R-103, and the occurring time of the second abnormality is PM 1:20.

According to the above, the system 1 can then obtain the apparatus parameters of FCU-01 and PAH-01 taking charge of the first meeting room R-101 that are recorded at PM 1:05, and inputs the apparatus parameters to an algorithm to analyze the occurring reason of the first abnormality. Also, the system 1 can obtain the apparatus parameters of FCU-05 and PAH-02 taking charging of the third meeting room R-103 that are recorded at PM 1:20, and inputs the apparatus parameters to the algorithm to analyze the occurring reason of the second abnormality.

Through the system 1 and the method disclosed in the present invention, the manager can easily find out the occurring reason for any abnormality occurs in each area. Also, even the areas inside a building are re-defined somehow, the algorithm adopted by the system 1 is not necessary to be modified, so the cost of both time and money in adjusting the system 1 can be effectively reduced.

As the skilled person will appreciate, various changes and modifications can be made to the described embodiment. It is intended to include all such variations, modifications and equivalents which fall within the scope of the present invention, as defined in the accompanying claims.

What is claimed is:

1. An area abnormality detecting system, comprising:
   a detecting server, logically segmenting a space into a plurality of blocks with a same size, wherein the space comprises multiple areas, and each of the areas is respectively constituted by the blocks with different numbers, wherein the detecting server comprises a storage unit having a plane figure, an area comparison table, a sensor comparison table and an apparatus comparison table, the plane figure records spatial data of the space, the detecting server segments the space logically into the plurality of blocks according to the plane figure, wherein the area comparison table records the relationship between each of the areas and each of the blocks;

a plurality of sensors, respectively sensing indoor environment of each of the areas and transmitting sensing data back to the detecting server; and a plurality of apparatuses, corresponding to each of the areas respectively, controlled by the detecting server for operation and recording apparatus parameters during the operation;

wherein the detecting server confirms an abnormal area and an occurring time of an abnormality when the abnormality is determined to occur based on the sensing data transmitted by a specific sensor of the plurality of sensors, and the detecting server obtains the apparatus parameters of specific apparatuses of the plurality of apparatuses corresponding to the abnormal area that are recorded at the occurring time, and determines an occurring reason for the abnormality based on the apparatus parameters of the specific apparatuses, wherein the abnormal area is a serving area where the specific sensor and the specific apparatuses take charge of, wherein the sensor comparison table records the relationship between the sensors and their serving area, and the apparatus comparison table records the relationship between the apparatuses and their serving area.

2. The area abnormality detecting system in claim 1, wherein the detecting server comprises:
a block segmenting unit, logically segmenting the space into the plurality of blocks ($S_i$); and
a setting unit, setting the size of the blocks, grouping the blocks respectively into each of the areas, and setting each of the areas respectively as the serving area for each of the sensors and each of the apparatuses.

3. The area abnormality detecting system in claim 2, wherein each of the blocks has a minimal size which cannot be further segmented by the block segmenting unit, and the blocks are not overlapped with each other.

4. The area abnormality detecting system in claim 3, wherein the size of each of the blocks is 20 cm×20 cm or 10 cm×10 cm.

5. The area abnormality detecting system in claim 2, wherein the storage unit further stores an abnormal serial table, the detecting server updates the abnormal serial table regularly according to the sensing data, and the detecting server sets a flag in a corresponding column of the abnormal serial table as "0" when no abnormality is determined to occur, and sets the flag in the corresponding column of the abnormal serial table as "1" when the abnormality is determined to occur.

6. The area abnormality detecting system in claim 5, wherein the plurality of apparatuses at least comprises multiple pre-cooling air handling units and multiple fan coil units, and the apparatus comparison table further records covering relations between each of the PAHs and each of the FCUs, wherein at least parts of the serving area of a specific PAH is overlapped with other serving area of a specific FCU if the specific FCU is covered with the specific PAH.

7. The area abnormality detecting system in claim 5, wherein the plurality of sensors comprises multiple environmental sensors and multiple apparatus sensors, wherein the environmental sensors are used to sense environment status of the serving area, the apparatus sensors are used to sense apparatus status of each of the apparatuses, and the sensor comparison table further records data properties of the sensing data of each of the sensors.

8. The area abnormality detecting system in claim 7, wherein the multiple environmental sensors comprise at least one of person detector, temperature sensor, humidity sensor and $CO_2$ sensor.

9. The area abnormality detecting system in claim 5, wherein the apparatus parameters of each of the apparatuses comprise control parameters that are readable and writeable, and property parameters that are only readable, the detecting server determines the occurring reason for the abnormalities to be mis-controlled of the area abnormality detecting system or a manager to the apparatuses, lack of capacity of the apparatuses, or an environmental problem of the abnormal area itself according to both of the property parameters and the control parameters.

10. An area abnormality detecting method, adopted by an area abnormality detecting system, the area abnormality detecting system comprising multiple sensors, multiple apparatuses and a detecting server, the area abnormality detecting method comprising:
a) obtaining a plane figure and segmenting logically a space into a plurality of blocks with a same size according to the plane figure by the detecting server, wherein the plane figure records spatial data of the space;
b) generating an area comparison table and grouping the plurality of blocks respectively into a plurality of areas of the space according to the area comparison table, wherein the area comparison table records the relationship between each of the areas and the blocks;
c) generating a sensor comparison table and an apparatus comparison table and relating the sensors and the apparatuses respectively with the areas according to the sensor comparison table and the apparatus comparison table, wherein the sensors respectively sense indoor environment of each of the areas, and the apparatuses respectively accept control of the detecting server for operation and record apparatus parameters during the operation;
d) receiving sensing data from the sensors by the detecting server;
e) confirming an abnormal area and an occurring time of an abnormality when the detecting server determines the abnormality occurs according to the sensing data transmitted from a specific sensor of the plurality of sensors, wherein the abnormal area is a serving area wherein the specific sensor takes charge of, and the sensor comparison table records the relationship between the sensors and their serving area;
f) obtaining the apparatus parameters of specific apparatuses of the plurality of apparatuses corresponding to the abnormal area that are recorded at the occurring time, wherein the abnormal area is the serving area where the specific apparatuses take charge of, and the apparatus comparison table records the relationship between the apparatuses and their serving area; and
g) determining an occurring reason for the abnormality by the detecting server based on the apparatus parameters.

11. The area abnormality detecting method in claim 10, wherein the step a) comprises following steps of:
a01) obtaining a block setting value, wherein the block setting value indicates the size of the blocks; and a02) segmenting the space logically into the plurality of blocks according to the plane figure and the block setting value, wherein each of the blocks respectively has a minimal size which cannot be further segmented, and the blocks are not overlapped with each other.

12. The area abnormality detecting method in claim 10, wherein the step b) is to execute an area setting procedure to respectively group the blocks into each of the areas, and the step c) is to execute a sensor setting procedure and an apparatus setting procedure to respectively set each of the areas as the serving area for each of the sensors and each of the apparatuses.

13. The area abnormality detecting method in claim 12, further comprising: step h) receiving a target comfort degree of one of a plurality of serving areas; wherein the step c) is to control, after receiving the target comfort degree, the apparatuses corresponding to the serving area which has the target comfort degree to operate to provide an environmental improving service for the serving area and record the apparatus parameters.

14. The area abnormality detecting method in claim 12, further comprising following steps after the step d):
  i1) setting a flag of a corresponding column of an abnormal serial table as 0 if no abnormality is determined to occur; and
  i2) setting the flag of the corresponding column of the abnormal serial table as 1 if the abnormality is determined to occur.

15. The area abnormality detecting method in claim 14, wherein the step i2) simultaneously records the abnormal area and the occurring time of the abnormality with the flag in the corresponding column of the abnormal serial table.

16. The area abnormality detecting method in claim 15, further comprising: step j) extracting all flags recorded as 1 from the abnormal serial table for obtaining the occurring time of all abnormality and generating a time distributed diagram.

17. The area abnormality detecting method in claim 12, wherein the apparatus parameters comprise control parameters that are readable and writeable, and property parameters that are only readable, wherein the step g) is to determine the occurring reason for the abnormality to be mis-controlled of the area abnormality detecting system or a manager to the apparatuses, lack of capacity of the apparatuses, or an environmental problem of the abnormal area itself according to both of the property parameters and the control parameters.

18. The area abnormality detecting method in claim 12, wherein the apparatus comparison table further records an arranged area of each of the apparatuses inside the space, and the area abnormality detecting method further comprises: step k) obtaining the arranged area of the apparatuses corresponding to the abnormal area and sending a maintaining notification according to the arranged area.

* * * * *